(12) United States Patent
Eto et al.

(10) Patent No.: US 12,275,070 B2
(45) Date of Patent: Apr. 15, 2025

(54) END MILL

(71) Applicant: MITSUBISHI HEAVY INDUSTRIES, LTD., Tokyo (JP)

(72) Inventors: Jun Eto, Tokyo (JP); Hirokazu Unno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 743 days.

(21) Appl. No.: 17/293,712

(22) PCT Filed: Jan. 21, 2020

(86) PCT No.: PCT/JP2020/001817
§ 371 (c)(1),
(2) Date: May 13, 2021

(87) PCT Pub. No.: WO2020/170689
PCT Pub. Date: Aug. 27, 2020

(65) Prior Publication Data
US 2022/0001466 A1 Jan. 6, 2022

(30) Foreign Application Priority Data

Feb. 22, 2019 (JP) .................................. 2019-030835

(51) Int. Cl.
*B23C 3/16* (2006.01)
*B23C 5/10* (2006.01)

(52) U.S. Cl.
CPC .............. *B23C 3/16* (2013.01); *B23C 5/1009* (2013.01); *B23C 2210/084* (2013.01); *B23C 2210/54* (2013.01)

(58) Field of Classification Search
CPC ... B23C 3/16; B23C 5/1009; B23C 2210/084; B23C 5/10; B23C 2210/082; Y10T 407/1948; Y10T 407/1964
See application file for complete search history.

(56) References Cited

U.S. PATENT DOCUMENTS 6,684,742 B1 * 2/2004 White ................... B23C 5/10
82/1.11
7,125,210 B2 * 10/2006 Kolker ................ B23C 5/109
407/54

(Continued)

FOREIGN PATENT DOCUMENTS

DE 4405987 A1 * 9/1994 ........... B23C 5/1009
EP 2030712 A1 * 3/2009 ............... B23C 5/10

(Continued)

OTHER PUBLICATIONS

International Search Report and Written Opinion of International Application No. PCT/JP2020/001817 mailed Mar. 31, 2020; 13pp.

*Primary Examiner* — Sara Addisu
(74) *Attorney, Agent, or Firm* — HAUPTMAN HAM, LLP

(57) ABSTRACT

The purpose of the present invention is to perform machining on a double-curved surface to have good finished surface characteristics while achieving high speed feeding. An end mill (2) is provided with a bottom blade (2A) formed in a curved convex and circular arc shape, and a radius blade (2B) located at the edge and formed in a circular arc shape. The bottom blade (2A) has a region where a blade part is not formed on the axis of the end mill (2), and the end mill (2) is further provided with a center blade (2C) in the region of the bottom blade (2A). The center blade (2C) is formed in a circular arc shape with a radius smaller than that of the circular arc part of the bottom blade (2A).

11 Claims, 7 Drawing Sheets

(56) References Cited

U.S. PATENT DOCUMENTS

| | | | |
|---|---|---|---|
| 2005/0025584 A1 | 2/2005 | Kolker et al. | |
| 2008/0193232 A1* | 8/2008 | van Iperen | B23C 5/10 |
| | | | 407/54 |
| 2009/0252564 A1* | 10/2009 | Volokh | B23C 5/10 |
| | | | 407/56 |
| 2010/0143052 A1* | 6/2010 | Aoki | B23C 5/10 |
| | | | 407/54 |
| 2010/0172703 A1* | 7/2010 | Neubold | B23C 5/10 |
| | | | 407/53 |
| 2014/0003873 A1* | 1/2014 | Han | B23C 5/10 |
| | | | 407/54 |
| 2016/0256940 A1* | 9/2016 | Wu | B23C 3/18 |
| 2021/0323081 A1* | 10/2021 | Eto | B23C 3/10 |
| 2021/0394284 A1* | 12/2021 | Eto | B23C 3/16 |
| 2023/0064805 A1* | 3/2023 | Koch | B23C 5/10 |

FOREIGN PATENT DOCUMENTS

| | | | | |
|---|---|---|---|---|
| JP | 03060909 A | * | 3/1991 | ........... B23C 5/1009 |
| JP | 2001071209 A | | 3/2001 | |
| JP | 2010520064 A | | 6/2010 | |
| JP | 6278170 B1 | | 2/2018 | |

* cited by examiner

N=4, n=4

N=4, n=2

N=4, n=1

END MILL

RELATED APPLICATIONS

The present application is a National Phase of International Application Number PCT/JP2020/001817 filed Jan. 21, 2020 and claims priority to Japanese Application Number 2019-030835 filed Feb. 22, 2019.

TECHNICAL FIELD

The present disclosure relates to an end mill.

BACKGROUND ART

When a plate-like aircraft structural component such as the skin or the like of a fuselage or a main wing is produced, a compound curved surface may be formed in a plate-like component (workpiece) by machining. The compound curved surface is generally formed by contouring or streaking using a ball end mill or a radial end mill.

Unlike the ball end mill or the radial end mill, there is a cutting tool called a barrel tool or a lens tool which includes an arc portion having a curved convex shape in an outer peripheral edge or a bottom edge and in which the curvature radius of the arc portion is large. The following PTLs 1 to 3 disclose a tool of which both the outer peripheral edge and the bottom edge have a curvature.

CITATION LIST

Patent Literature

[PTL 1] Japanese Patent Publication No. 6278170
[PTL 2] U.S. Pat. No. 6,684,742 Specification
[PTL 3] US Unexamined Patent Application Publication No. 2010/0172703 Specification

SUMMARY OF INVENTION

Technical Problem

The lens tool including the arc portion having a curved convex shape in the bottom edge is used when a bottom surface (planar shape) is formed in a workpiece. Accordingly, the feed interval (peak feed) can be made larger than when the ball end mill is used, and a reduction in processing time or an improvement in surface roughness can be obtained.

In the lens tool, when a cutting edge is provided at the tool center, during cutting, a region in which the cutting speed is 0 (zero) is formed at the center. For this reason, as a result of machining, burrs are generated.

In addition, when a processed product having a compound curved surface is formed, it is difficult to incline the end mill due to CAM control and restrictions to a processing device. In that case, it is required to perform machining by tip point control (tool center control).

Like the radial end mill, a configuration in which the cutting edge is not provided at the tool center can be considered. However, in the lens tool, unlike the radial end mill, since the bottom edge has a curvature, the vicinity of the center is left uncut. As a result, the edge shape in the vicinity of the tool center is transferred to a finished surface.

The present disclosure has been made in view of such circumstances, and an object of the present disclosure is to provide an end mill capable of processing a compound curved surface with good finished surface properties at a high feed speed.

Solution to Problem

According to an aspect of the present disclosure, there is an end mill including: a bottom edge formed in a curved convex shape and in an arc shape; and a radial edge provided at a corner and formed in an arc shape. The bottom edge has a region in which a cutting portion is not formed on an axis of the end mill. In the region of the bottom edge, a center edge is further provided, the center edge being formed in an arc shape having a smaller radius than a radius of an arc portion of the bottom edge.

According to this configuration, in the bottom edge, there is no cutting edge of which the cutting speed is 0 (zero) since the region in which the cutting portion is not formed on the axis of the end mill is provided, so that the generation of burrs can be reduced.

In the region in which the cutting portion is not formed on the axis of the end mill, the center edge is formed in an arc shape having a smaller radius than that of the arc portion of the bottom edge. Accordingly, the surface roughness can be further suppressed as compared with when the center edge is not provided.

In the end mill according to the disclosure, a diameter of the region in a direction perpendicular to an axial direction of the end mill may be set such that a planar portion of a shape to be processed is formed in a shape within a target range.

According to this configuration, due to the set diameter of the region, in which the cutting portion is not formed on the axis of the end mill, in the direction perpendicular to the axial direction of the end mill, the planar portion of the shape to be processed is formed in the shape within the target range (range determined based on the target shape).

In the end mill according to the disclosure, the radius of the arc portion of the bottom edge may be set such that a planar portion of a shape to be processed is formed in a shape within a target range.

According to this configuration, due to the set radius of the arc portion of the bottom edge, the planar portion of the shape to be processed is formed in the shape within the target range.

In the end mill according to the disclosure, a diameter of the region in a direction perpendicular to an axial direction of the end mill may be set such that a cutting speed of the center edge is an allowable minimum cutting speed or more.

According to this configuration, due to the set diameter of the region, in which the cutting portion is not formed on the axis of the end mill, in the direction perpendicular to the axial direction of the end mill, the cutting speed of the center edge is set to the allowable minimum cutting speed or more.

In the end mill according to the disclosure, a radius of an arc portion of the center edge may be set such that rubbing does not occur during machining.

According to this configuration, due to the set radius of the arc portion of the center edge, rubbing does not occur during machining.

In the end mill according to the disclosure, the number of the center edges may be set such that the planar portion of the shape to be processed is formed to have a required surface roughness or less.

According to this configuration, due to the set number of center edges, the planar portion of the shape to be processed is formed to have the required surface roughness or less.

Advantageous Effects of Invention

According to the present disclosure, a compound curved surface can be processed with good finished surface properties at a high feed speed.

DESCRIPTION OF EMBODIMENTS

Hereinafter, an embodiment according to the present disclosure will be described with reference to the drawings.

Figure 1:
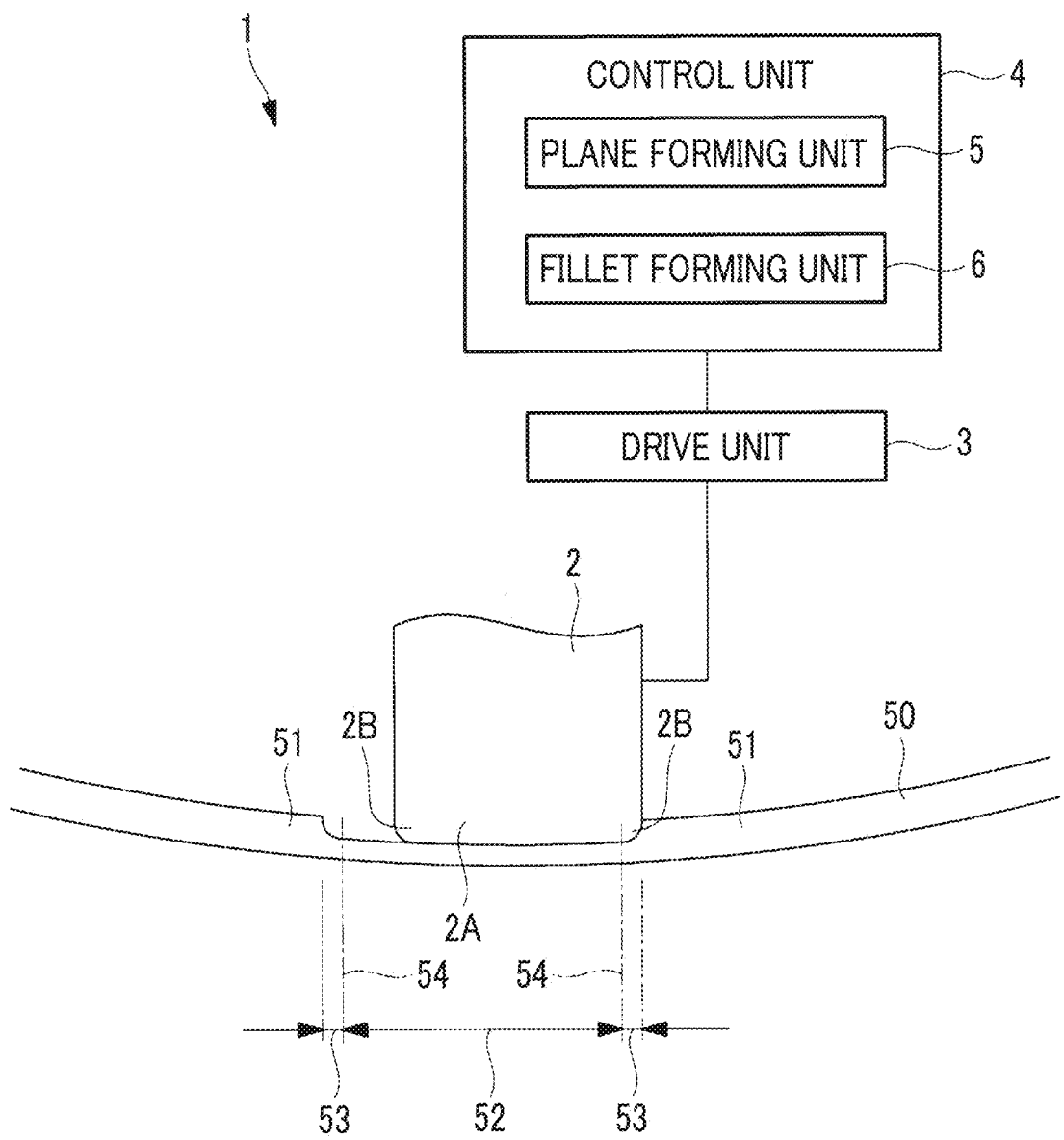
FIG. 1 is a configuration view illustrating a processing device according to one embodiment of the present disclosure.

As illustrated in FIG. 1, a processing device 1 according to one embodiment of the present disclosure includes, for example, an end mill 2, a drive unit 3, and a control unit 4. The processing device 1 cuts a workpiece 50 using the end mill 2 to form a predetermined shape in the workpiece 50. The predetermined shape in the present embodiment is, particularly, a concave shape that is formed in the workpiece 50 in a depth direction. The workpiece 50 is, for example, a metallic material such as an aluminum alloy or a titanium alloy.

Figure 2:
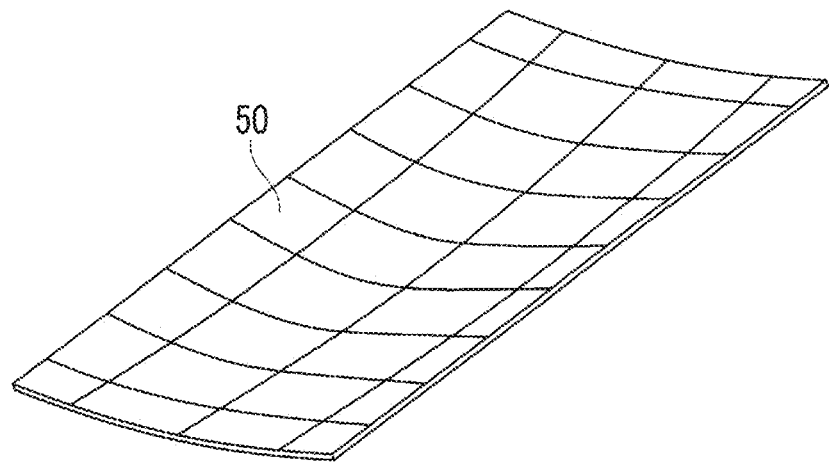
FIG. 2 is a perspective view illustrating a workpiece.
Figure 3:
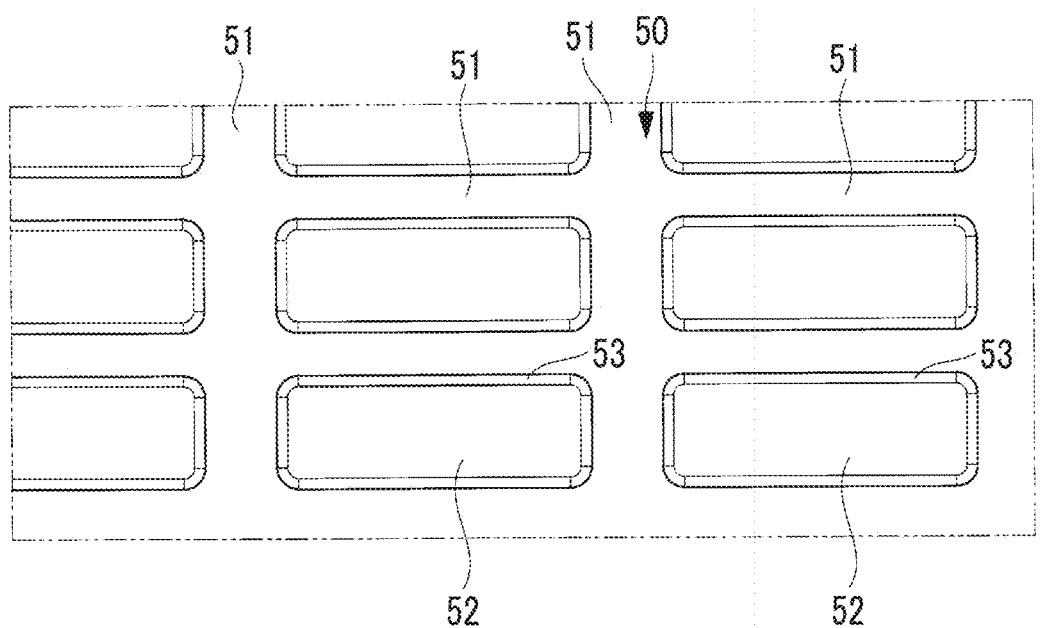
FIG. 3 is a partially enlarged plan view illustrating the workpiece.

As illustrated in FIGS. 1 to 3, for example, the workpiece 50 is a plate-like component, and in order to secure the strength of the workpiece 50, a rib 51 protruding in a height direction (thickness direction) on one surface side is formed, and a region surrounded by the rib 51 is formed thin. In this case, a region other than the uppermost surface of the rib 51 has a concave shape. The concave shape includes a planar portion 52 formed in a bottom portion of a concave portion. Then, in the concave shape, in order to improve the strength, a connecting portion between the planar portion 52 and the rib 51 is provided not with a non-rounded pin angle but with a fillet-shaped portion 53.

The planar portion 52 may be a flat surface without a curvature, or may have a curved surface shape with a curvature. The fillet-shaped portion 53 has an arc shape having a predetermined radius. One end side of the fillet-shaped portion 53 is formed to be continuous with the planar portion 52, and the other end side of the fillet-shaped portion 53 forms a side wall surface of the rib 51 or is formed to be continuous with the side wall surface of the rib 51.

A boundary 54 between the planar portion 52 and the fillet-shaped portion 53 is a portion in which the curvature of the planar portion 52 (including the case of a flat surface having a curvature of 0 (zero)) and the curvature of the fillet-shaped portion 53 change.

Figure 4:
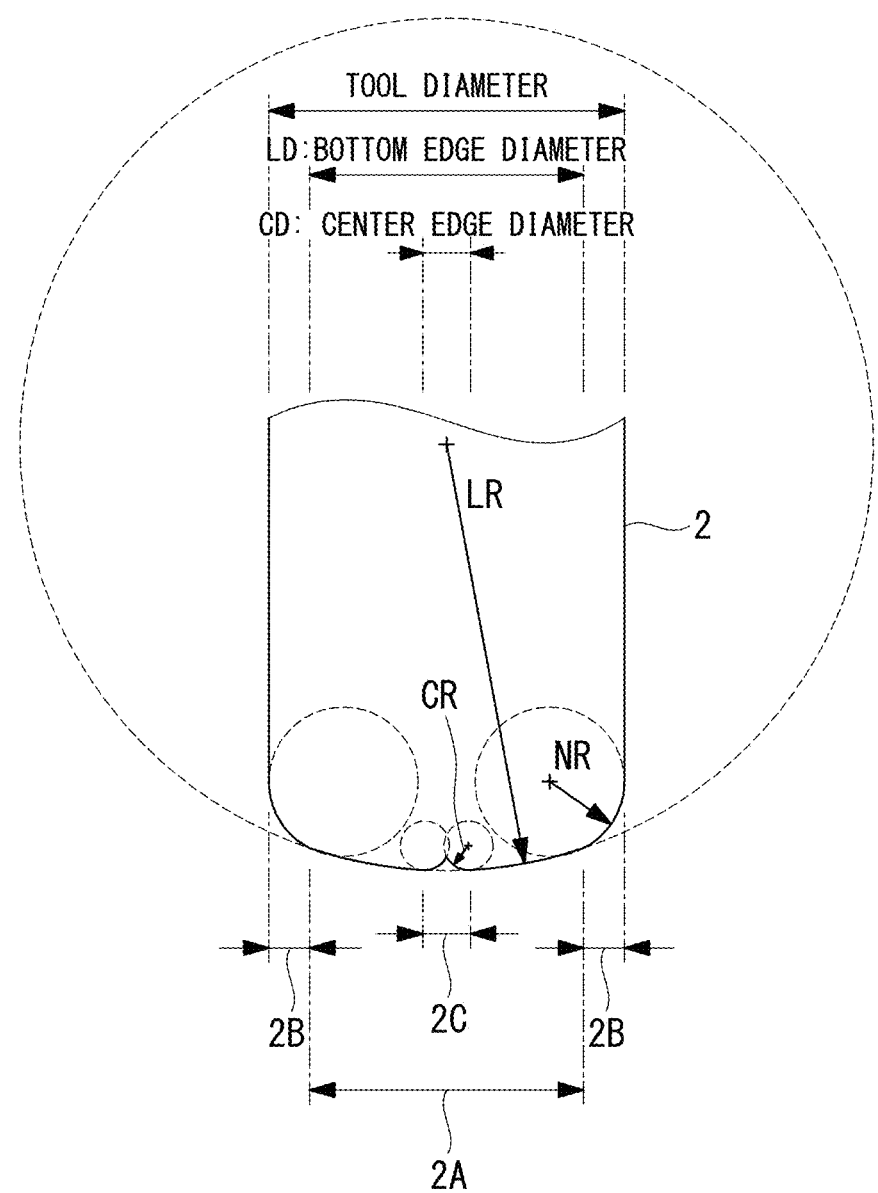
FIG. 4 is a schematic view illustrating an end mill of the processing device according to one embodiment of the present disclosure.

While rotating around an axis, the end mill 2 can move in an axial direction or a feeding direction to cut the workpiece 50. As illustrated in FIG. 4, the end mill 2 includes a bottom edge 2A that is formed in a curved convex shape, and a radial edge 2B that is provided at the corner and is formed in an arc shape. The bottom edge 2A has a region in which the bottom edge 2A is not formed on the axis of the end mill 2. In addition, the end mill 2 includes a center edge 2C in the region, the center edge 2C being formed in an arc shape having a smaller curvature radius than that of an arc portion of the bottom edge 2A.

The bottom edge 2A protrudes such that a portion on the axis of the end mill 2 is located at the lowest position, and is formed in an arc shape having a predetermined radius. The radial edge 2B is provided at an outer peripheral side corner of the bottom edge 2A, and is formed in an arc shape having a predetermined radius. The radius of the arc portion of the bottom edge 2A is larger than the tool diameter (outer diameter) of the end mill 2, and is larger than the radius of an arc portion of a so-called ball end mill.

The drive unit 3 includes a plurality of motors, a switching unit configured to switch the end mill 2, and the like. A main shaft motor receives electric power to be driven to rotate the end mill 2 around the axis. A motor for movement receives electric power to be driven to move the end mill 2 in the axial direction or a direction perpendicular to the axial direction (feeding direction).

The control unit 4 includes, for example, a plane forming unit 5, a fillet forming unit 6, and the like.

The plane forming unit 5 controls the drive unit 3 such that the bottom edge 2A forms the planar portion 52 of a shape to be processed in the workpiece 50. The fillet forming unit 6 controls the drive unit 3 such that the radial edge 2B forms the fillet-shaped portion 53 in the workpiece 50 in one pass.

The control unit 4 includes, for example, a central processing unit (CPU), a random access memory (RAM), a read only memory (ROM), a computer-readable storage medium, and the like. Then, as one example, a series of processes for realizing various functions are stored in the storage medium or the like in the form of a program, and the CPU reads the program into the RAM or the like to execute information processing and arithmetic processing, so that the various functions are realized. Incidentally, a form in which the program is installed in the ROM or another storage medium in advance, a form in which the program is provided in a state where the program is stored in the computer-readable storage medium, a form in which the program is distributed via wired or wireless communication means, and the like may be applied. The examples of the computer-readable storage medium include magnetic disks, magneto-optical disks, CD-ROMs, DVD-ROMs, semiconductor memories and the like.

The shape to be processed in the workpiece 50 is a concave shape, and the concave shape includes the planar portion 52, and the fillet-shaped portion 53 adjacent to the planar portion 52.

Next, the shape of the end mill 2 according to the present embodiment will be described.

According to the end mill 2 of the present embodiment, in the bottom edge 2A, there is no cutting edge of which the cutting speed is 0 (zero) since a region in which a cutting portion is not formed on the axis of the end mill 2 is provided, so that the generation of burrs can be reduced.

Figure 8:
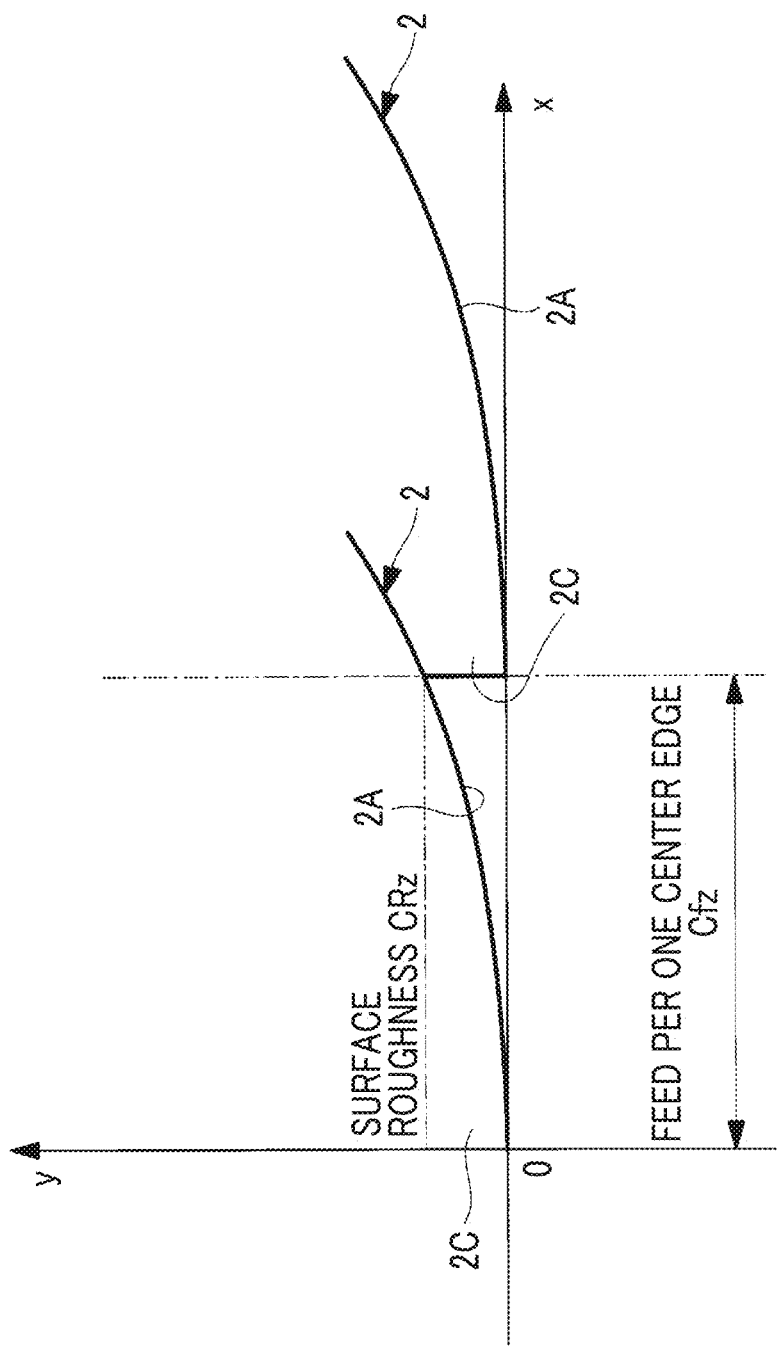
FIG. 8 is a partially enlarged schematic view illustrating the bottom edge and the center edge of the end mill of the processing device according to one embodiment of the present disclosure, and illustrates an example in which a center edge nose portion is not provided in the center edge.

In addition, in the region in which the cutting portion is not formed on the axis of the end mill 2, the center edge 2C is formed in an arc shape having a smaller radius than that of the arc portion of the bottom edge 2A (center edge nose portion). Accordingly, as illustrated in FIG. 8, the surface roughness can be further suppressed as compared with when the center edge nose portion having an arc shape is not provided in the center edge 2C.

The curvature radius (nose diameter) of the radial edge (nose portion) 2B of the end mill 2 is denoted by NR, the curvature radius (lens diameter) of the bottom edge (lens portion) 2A is denoted by LR, and the diameter (bottom edge diameter) of a region, which is occupied by the bottom edge 2A, in the direction perpendicular to the axial direction of the end mill 2 is denoted by LD.

Figure 5:
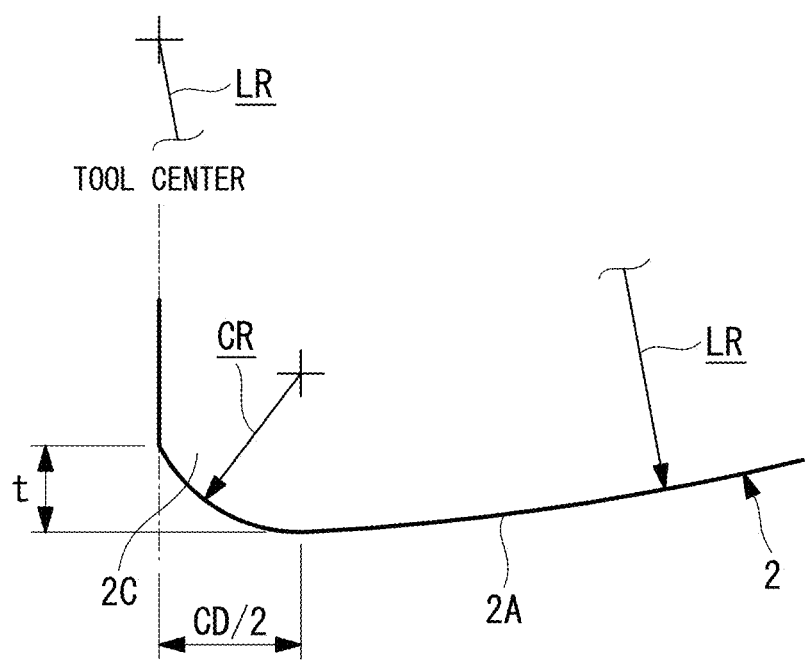
FIG. 5 is a partially enlarged schematic view illustrating a bottom edge and a center edge of the end mill of the processing device according to one embodiment of the present disclosure.

As illustrated in FIG. 5, in the bottom edge 2A, the diameter (center edge diameter) of the region, in which the cutting portion is not formed on the axis of the end mill 2, in the direction perpendicular to the axial direction of the end mill 2 is denoted by CD, and the radius (center edge nose diameter) of an arc portion of the center edge 2C is denoted by CR. The center edge diameter CD and the center edge nose diameter CR are determined as follows.

The center edge diameter CD is required to satisfy the following two items.

Since the cutting portion is not formed on the axis of the end mill 2 in the bottom edge 2A, the tool length is further shortened as compared with when the cutting portion is formed in the bottom edge 2A. When the tool length shortening amount is denoted by Dl, the tool length shortening amount Dl is set to a tool length allowable tolerance I or less.

$$Dl \leq I$$

The tool length allowable tolerance I is set according to the processing accuracy, and is, for example, −0.01 mm. Incidentally, the tool length shortening amount Dl is expressed by the following equation.

$$Dl = h(LR, CD) = \sqrt{LR^2 - \frac{CD^2}{4}} - LR \qquad \text{[Equation 1]}$$

In addition, a cutting speed CVc of the center edge 2C is set to an allowable cutting speed Vclim or more.

$$CVc \geq Vclim$$

For example, the allowable cutting speed Vclim is a cutting speed at which welding to the workpiece does not occur during machining. The cutting speed CVc of the center edge 2C is expressed by the following equation.

$$CVc = i(CD, S) = \pi CD \times S \qquad \text{[Equation 2]}$$

Here, S is the main shaft rotation speed of the end mill 2.

When the workpiece is made of an aluminum alloy, the allowable cutting speed Vclim=100 m/min or more. When the processing device 1 can realize a high rotation speed, for example, S=30,000 min$^{-1}$ or more can be reached, so that the center edge diameter CD is set to 1 mm or more.

$$CD \geq 1 \text{ mm}$$

The tool length shortening amount Dl is a value determined by a function of the lens curvature radius LR and the center edge diameter CD.

$$Dl = h(LR, CD)$$

Therefore, the function h is determined, which is the relationship between the lens curvature radius LR and the center edge diameter CD when the tool length shortening amount Dl is a predetermined value Dl1.

The range of the center edge diameter CD in which the tool length shortening amount Dl is the predetermined value Dl1 or less is determined for each lens curvature radius LR by the function h. Therefore, the center edge diameter CD may be appropriately selected for a certain lens curvature radius LR such that the tool length shortening amount Dl is the predetermined value Dl1 or less.

The center edge nose diameter CR is determined based on a relief amount t of the center edge 2C.

The relief amount t of the center edge 2C is a value determined by a function of the center edge diameter CD and the center edge nose diameter CR.

$$t = g(CD, CR) = CR - \sqrt{CR^2 - \frac{CD^2}{4}} \qquad \text{[Equation 3]}$$

Therefore, a function g of the center edge diameter CD when the relief amount t is a predetermined value t1 and the center edge nose diameter CR is determined. Since the range of CR which satisfies a certain relief amount t for the center edge diameter CD is expressed by the following equation, $$CR - \sqrt{CR^2 - \frac{CD^2}{4}} \geq t \qquad \text{[Equation 4]}$$

CR is obtained as follows.

$$CR \leq \frac{CD^2}{8t} + \frac{t}{2} \qquad \text{[Equation 5]}$$

The range of the center edge nose diameter CR in which the relief amount t is the predetermined value t1 or more is determined for each center edge diameter CD by the function g. Therefore, the center edge nose diameter CR may be appropriately selected for a center edge diameter CD such that the relief amount t is the predetermined value t1 or more.

Next, the calculation of a surface roughness CRz and a method for determining the number n of center edges will be described.

The surface roughness CRz is a value determined by a function of the lens curvature radius LR, the center edge nose diameter CR, and a feed Cfz per one center edge.

$$CRz = f(LR, CR, Cfz)$$

Figure 6:
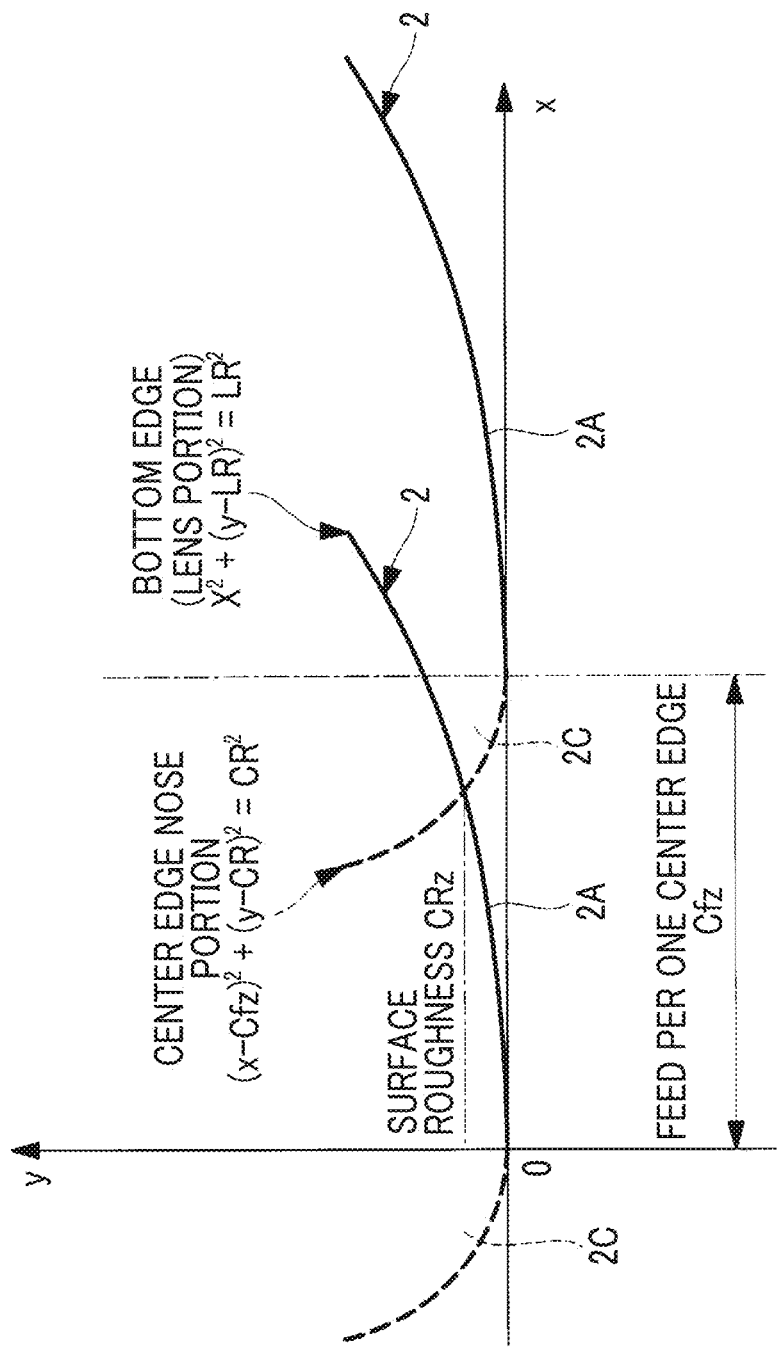
FIG. 6 is a partially enlarged schematic view illustrating the bottom edge and the center edge of the end mill of the processing device according to one embodiment of the present disclosure.

As illustrated in FIG. 6, the surface roughness CRz is a y-coordinate of the intersection of the cross-sectional curve of the center edge 2C and the cross-sectional curve of the bottom edge 2A.

The cross-sectional curve of the center edge 2C is expressed by the following equation.

$$(x-Cfz)^2+(y-CR)^2=CR^2 (x<Cfz) \quad \text{[Equation 6]}$$

The cross-sectional curve of the bottom edge 2A is expressed by the following equation.

$$x^2+(y-LR)^2=LR^2 (x>0) \quad \text{[Equation 7]}$$

Therefore, CRz is obtained as follows.

$$CRz = f(LR, CR, Cfz) = \frac{(LR+CR) - \sqrt{4LRCR - Cfz^2}}{2\left|\left(\frac{LR-CR}{Cfz}\right)^2 + 1\right|} \quad \text{[Equation 8]}$$

The feed Cfz per one center edge is represented by a feed amount fz per one tool edge, the number N of tool edges, and the number n of center edges.

$$Cfz = fz \times \frac{N}{n} \quad \text{[Equation 9]}$$

The surface roughness CRz is a maximum value when the planar portion 52 to be processed is a flat surface, and CRz is required to satisfy the following equation for a required surface roughness Rz.

$$CRz \leq Rz \div \alpha$$

Here, α is a safety factor, for example, 4.

The maximum value of Cfz can be obtained from the above equation. At this time, a cutting feed F is expressed by the following equation.

$$F = S \times fz \times N$$

Incidentally, S is a rotation speed.

When fz and N are values set by the tool, the processing machine, and the workpiece, the number of center edges can be determined by the following equation.

$$u = \text{roundup}\left(\frac{fz \times N}{Cfz}, 0\right), n \leq N \cdot fz \leq Cfz \quad \text{[Equation 00]}$$

From the above discussion, a function f relating to the lens curvature radius LR, the center edge nose diameter CR, and the feed Cfz per one center edge when the surface roughness CRz is a predetermined value CRz1 or less is determined.

The function f of the lens curvature radius LR and the center edge nose diameter CR when the surface roughness CRz is the predetermined value CRz1 or less is determined for each feed Cfz per one center edge. When the feed Cfz per one center edge is small, in order to obtain high finished surface properties, there is a tendency to be able to select a wide range of the lens curvature radius LR regardless of the center edge nose diameter CR, except when the lens curvature radius LR is small. On the other hand, when the feed Cfz per one center edge is large, in order to obtain high finished surface properties, it is required to select the lens curvature radius LR having a relatively large value regardless of the center edge nose diameter CR.

In order to obtain high finished surface properties by increasing the cutting feed F to not lower the processing efficiency, and reducing the surface roughness CRz, there are the following two countermeasures.

Namely, there are (1) a method of selecting a proper combination of the lens curvature radius LR and the center edge nose diameter CR to reduce the surface roughness CRz when the feed Cfz per one center edge is small, and (2) a method of properly selecting the number n of center edges to reduce the feed Cfz per one center edge when the feed Cfz per one center edge is large.

Figure 7A:
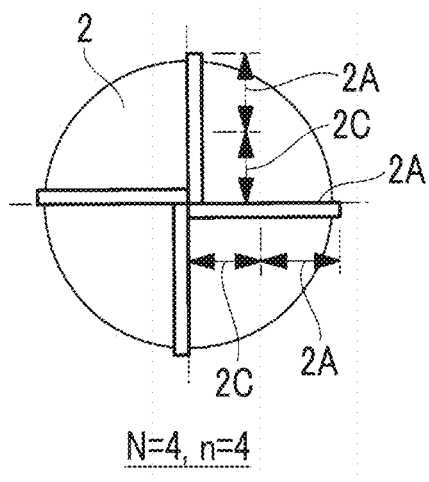
FIG. 7A is a bottom view illustrating the end mill of the processing device according to one embodiment of the present disclosure.
Figure 7B:
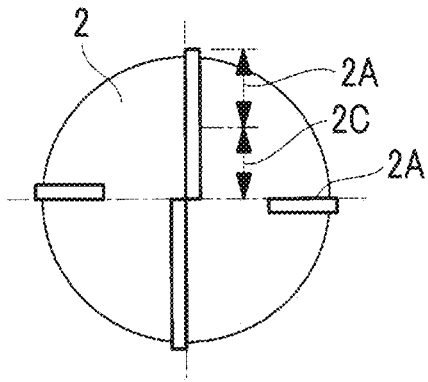
FIG. 7B is a bottom view illustrating the end mill of the processing device according to one embodiment of the present disclosure.
Figure 7C:
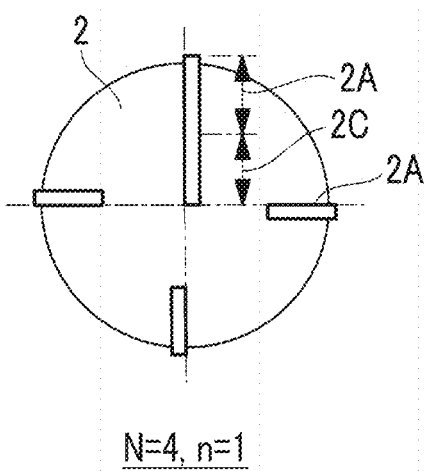
FIG. 7C is a bottom view illustrating the end mill of the processing device according to one embodiment of the present disclosure.

The following table shows the feed Cfz per one center edge when the number n of center edges is changed in a case where the number N of tool edges is 4 and the feed amount per one tool edge is fz. In addition, FIGS. 7A, 7B, and 7C illustrate examples of the end mill 2 in which the number N of tool edges is 4 and the numbers n of center edges are different from each other. FIG. 7A illustrates an example in which the number N of tool edges is 4 and the number n of center edges is 4 in the end mill 2, FIG. 7B illustrates an example in which the number N of tool edges is 4 and the number n of center edges is 2 in the end mill 2, and FIG. 7C illustrates an example in which the number N of tool edges is 4 and the number n of center edges is 1 in the end mill 2.

TABLE 1

| | | | |
|---|---|---|---|
| Number N of edges | 4 | 4 | 4 |
| Number n of center edges | 4 | 2 | 1 |
| Feed fz per one tool edge | fz | fz | fz |
| Feed Cfz per one center edge | fz | 2fz | 4fz |

The larger the ratio of the number n of center edges to the number N of tool edges is, the smaller the feed Cfz per one center edge can be. The smaller the ratio of the number n of center edges to the number N of tool edges is, the larger the feed Cfz per one center edge is. When the feed amount fz per one tool edge is increased, high-speed processing can be performed. Therefore, in order to reduce the feed Cfz per one center edge, the number N of tool edges may be reduced. However, this method is limited to when the lens curvature radius LR is large.

In a case where the lens curvature radius LR is small, even when the number of center edges is set to 1 and the ratio of the number n of center edges to the number N of tool edges is reduced, desired finished surface properties may not be obtained. In that case, when the feed amount fz per one tool edge or the number N of tool edges cannot be changed due to processing restrictions, the number n of center edges is increased, and the feed Cfz per one center edge is reduced under that condition.

As described above, according to the present embodiment, it is possible to obtain a tool that can obtain good finished surface properties in the planar portion (compound curved surface) 52 of any curvature radius, and can efficiently perform processing thereon. Then, the compound curved surface can be processed with good finished surface properties at a high feed speed by the tool.

REFERENCE SIGNS LIST

1: Processing device
2: End mill
2A: Bottom edge
2B: Radial edge
2C: Center edge
3: Drive unit 4: Control unit
5: Plane forming unit
6: Fillet forming unit
50: Workpiece
51: Rib
52: Planar portion
53: Fillet-shaped portion
54: Boundary

The invention claimed is:

1. An end mill comprising:
   a bottom edge formed in a curved convex shape and in an arc shape, the bottom edge forming a planar portion of a concave shape to be processed in a workpiece; and
   a radial edge provided at a corner and formed in an arc shape having a smaller radius of an arc portion of the bottom edge, the radial edge forming a fillet-shaped portion having an arc shape and being adjacent to the planar portion of the concave shape to be processed,
   wherein the bottom edge has a region in which a cutting portion is not formed on an axis of the end mill,
   in the region of the bottom edge, a center edge is further provided, the center edge being formed in an arc shape having a smaller radius than the radius of the arc portion of the bottom edge, and
   a radius of the arc portion of the bottom edge is larger than a tool diameter in a direction perpendicular to an axial direction of the end mill.

2. The end mill according to claim 1, wherein a diameter of the region in a direction perpendicular to an axial direction of the end mill is set such that a planar portion of a shape to be processed is formed in a shape within a target range.

3. The end mill according to claim 1, wherein the radius of the arc portion of the bottom edge is set such that a planar portion of a shape to be processed is formed in a shape within a target range.

4. The end mill according to claim 1, wherein a diameter of the center edge in a direction perpendicular to an axial direction of the end mill is set according to the following equation:

$$CD = CVc/(\pi \times S) \text{ and } CVc \geq Vclim$$

where CD is the diameter of the center edge in the direction perpendicular to the axial direction of the end mill, CVc is a cutting speed of the center edge, S is a main shaft rotation speed of the end mill, and Vclim is an allowable cutting speed of the center edge.

5. The end mill according to claim 2, wherein a radius of an arc portion of the center edge is set such that rubbing does not occur during machining.

6. The end mill according to claim 2, wherein the number of the center edges is set such that the planar portion of the shape to be processed is formed to have a required surface roughness or less.

7. The end mill according to claim 3, wherein a radius of an arc portion of the center edge is set such that rubbing does not occur during machining.

8. The end mill according to claim 4, wherein a radius of an arc portion of the center edge is set such that rubbing does not occur during machining.

9. The end mill according to claim 3, wherein the number of the center edges is set such that the planar portion of the shape to be processed is formed to have a required surface roughness or less.

10. The end mill according to claim 4, wherein the number of the center edges is set such that the planar portion of the shape to be processed is formed to have a required surface roughness or less.

11. The end mill according to claim 5, wherein the number of the center edges is set such that the planar portion of the shape to be processed is formed to have a required surface roughness or less.

* * * * *